No. 767,274. PATENTED AUG. 9, 1904.
J. HORTON.
VALVE FOR STEAM ENGINES.
APPLICATION FILED JAN. 22, 1904.
NO MODEL.
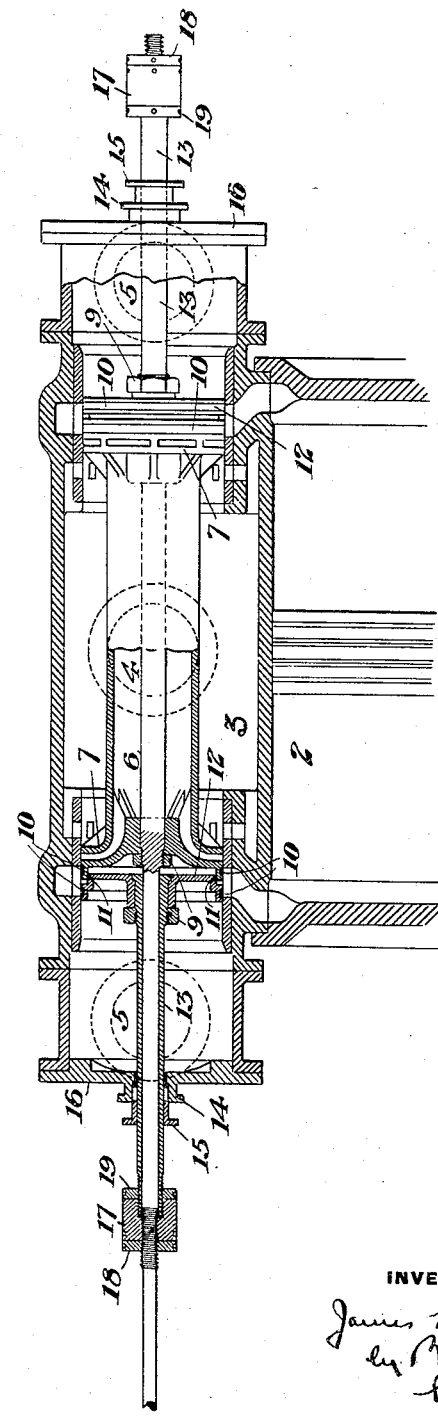
WITNESSES
INVENTOR No. 767,274. Patented August 9, 1904.

UNITED STATES PATENT OFFICE.

JAMES HORTON, OF MUNHALL, PENNSYLVANIA.

VALVE FOR STEAM-ENGINES.

SPECIFICATION forming part of Letters Patent No. 767,274, dated August 9, 1904.

Application filed January 22, 1904. Serial No. 190,181. (No model.)

*To all whom it may concern:*

Be it known that I, JAMES HORTON, of Munhall, Allegheny county, Pennsylvania, have invented a new and useful Improvement in Valves for Steam-Engines, of which the following is a full, clear, and exact description, reference being had to the accompanying drawing, forming part of this specification, which is a sectional plan through the cylinder and steam-chest of a steam-engine equipped with my improved adjustable valve.

The object of my invention is to provide a piston-valve for steam-engines in which the amount of exhaust lap may be varied to suit the conditions met with in operating the engine either as a condensing or non-condensing engine and to provide means for easily and quickly making the adjustments caused by changing from one method of operating to the other without removing the cover or heads from the steam-chest of the engine.

In the drawing, 2 represents the cylinder, and 3 the steam-chest, of a steam-engine in sectional plan with the steam-inlet 4 and exhaust-outlets 5 5. On the valve-rod 6 is the piston-valve 7 7, being held in place by the screw-nuts 9 9.

10 10 represent the usual split piston-rings to keep a steam-tight joint between the pistons and walls of the steam-chest, and 11 11 represent similar rings for maintaining a steam-tight joint between the piston-valve 7 7 and adjustable lap portions 12 12.

The adjustable exhaust-lap portions 12 of the piston-valve 7 7 are fixed to the inner ends of sleeves 13 13, which extend outside the steam-chest through stuffing-boxes 14 14 and glands 15 in the chest heads or covers 16. The sleeves 13 are adjustably attached on their outer ends to the piston-valve rod 6 by sleeve-nuts 17, having right and left hand threaded portions which engage similar threaded portions on the sleeves and valve-rod.

By means of the sleeve-nuts the amount of exhaust lap may be easily and quickly varied as desired without removing the heads or covers from the steam-chest. The jam-nuts 18 19 serve to lock and securely hold the sleeves in the desired position on the valve-rod.

In some steam plants it is necessary to operate the engines part of the time as condensing-engines and part of the time as non-condensing engines. When a central condensing plant is used in connection with a large number of widely-separated engines, the necessary adjusting of the lap of the valves when changing from one method of operating to the other becomes a very serious question on account of the large amount of time in the operation of the engines which is lost in readjusting the engine-valves. Heretofore when making a change in the method of operating the engines the valves in use were commonly replaced by other valves having the required exhaust lap to suit the new conditions or suitable parts of the valves were bolted to or unbolted from the valves then on the engines. To accomplish this, it was necessary to remove and replace the heads or covers from the steam-chest, which required a large amount of time in which the engines could not be operated. Many valves or parts of valves were necessary to admit of such change being made and the cost of maintaining the engines greatly increased.

By means of my improved valve all this is avoided. The exhaust lap may be easily and quickly changed as required without removing heads or covers from the steam-chest, while the time required for making the changes is reduced to a minimum.

Variations in the mechanism may be made without departing from my invention, since

What I claim is—

1. A steam-engine valve having a portion controlling the inlet-port, other portions adjustably connected thereto and controlling the exhaust-ports, and means external to the valve-chest having connections arranged to adjust the distance between the exhaust-controlling portions of said valve; substantially as described.

2. A balanced piston-valve having a portion arranged to control the inlet, other portions adjustably connected thereto and arranged to control the exhaust-ports, and means external to the steam-chest having a connection arranged to adjust the distance between the exhaust-controlling portions of the valve; substantially as described.

3. A balanced steam-engine valve having a circular portion arranged to control the inlet-port, another ring portion adjustable relative thereto and controlling the exhaust-port, and a sleeve extending from the exhaust-port portion to a point external to the steam-chest and adjustably secured to the valve-stem at said external point; substantially as described.

4. A balanced piston-valve having at both ends annular portions controlling the inlet-ports, and adjustable annular portions controlling the exhaust-ports and having a packing connection with the inlet-control portions, and sleeves extending from the adjustable valve portions and adjustably secured to the valve-stem at points exterior to the valve-chest; substantially as described.

5. A steam-engine piston-valve in combination with a valve-rod, pistons on the rod, adjustable lap portions movable on said rod and means for adjusting and locking in position the movable lap portions; substantially as described.

6. A steam-engine piston-valve in combination with a valve-rod, pistons on the rod, adjustable lap portions movable on the rod and means outside the steam-chest for adjusting and locking in position the movable lap portions; substantially as described.

In testimony whereof I have hereunto set my hand.

JAMES HORTON.

Witnesses:
RICHARD D. LITTLE,
W. H. CORBETT.